United States Patent [19] [11] 4,089,097
Good et al. [45] May 16, 1978

[54] METHOD OF FORMING AN ANNULAR SLOT IN A LONGITUDINALLY SPLINED ANNULAR MEMBER

[75] Inventors: William K. Good, Pontiac; Wilson J. Harbage, Birmingham, both of Mich.

[73] Assignee: Koppy Corporation, Ferndale, Mich.

[21] Appl. No.: 742,669

[22] Filed: Nov. 17, 1976

Related U.S. Application Data

[62] Division of Ser. No. 617,814, Sep. 29, 1975, Pat. No. 4,014,619.

[51] Int. Cl.² .............................................. B23P 15/16
[52] U.S. Cl. .................................. 29/163.5 R; 29/453; 72/362
[58] Field of Search .......................... 29/163.5 R, 453; 192/70.2; 403/359; 52/674; 720/362

[56] References Cited

U.S. PATENT DOCUMENTS

| 455,307 | 7/1891 | Cook | 29/163.5 R UX |
| 462,333 | 11/1891 | Sill | 52/674 |
| 1,732,965 | 10/1929 | Carhart | 192/70.2 |
| 1,963,629 | 6/1934 | Mark | 29/163.5 R |
| 3,276,108 | 10/1966 | White | 29/163.5 R X |
| 3,841,452 | 10/1974 | Newsock | 192/70.2 X |

Primary Examiner—Charlie T. Moon
Attorney, Agent, or Firm—Gifford, Chandler, Van Ophem, Sheridan & Sprinkle

[57] ABSTRACT

Lanced slots are formed in the root section of each spline of a splined member to receive a snap ring for securing discs or other members in position with respect to the splined member.

6 Claims, 6 Drawing Figures

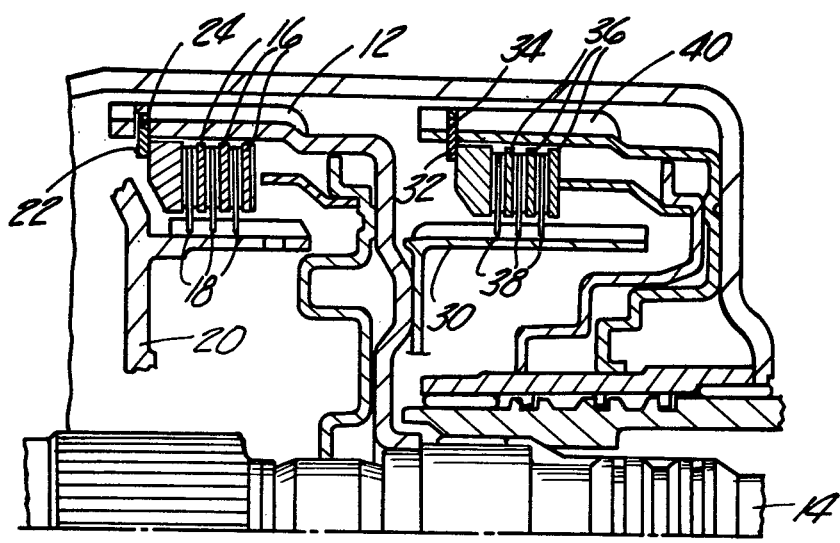
Fig-1
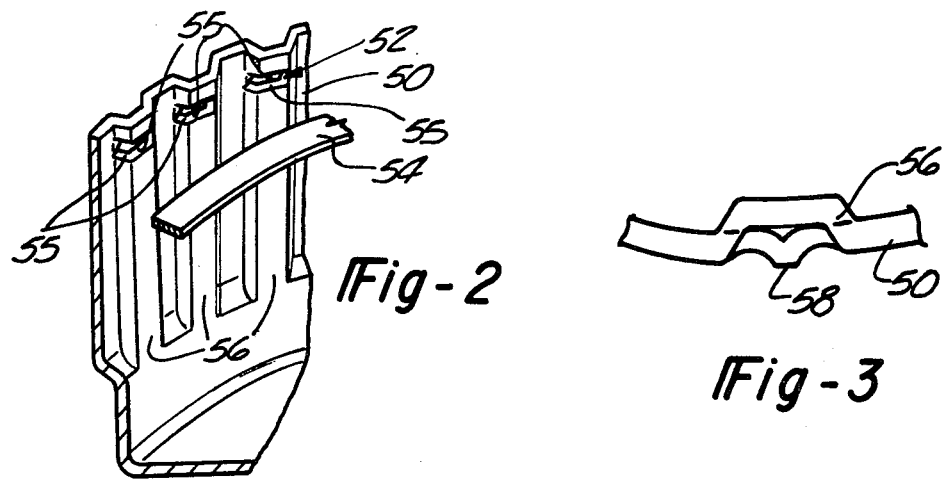
Fig-2
Fig-3
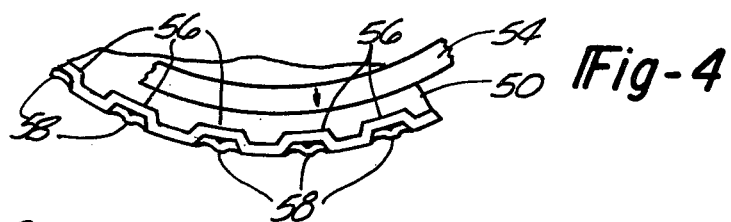
Fig-4
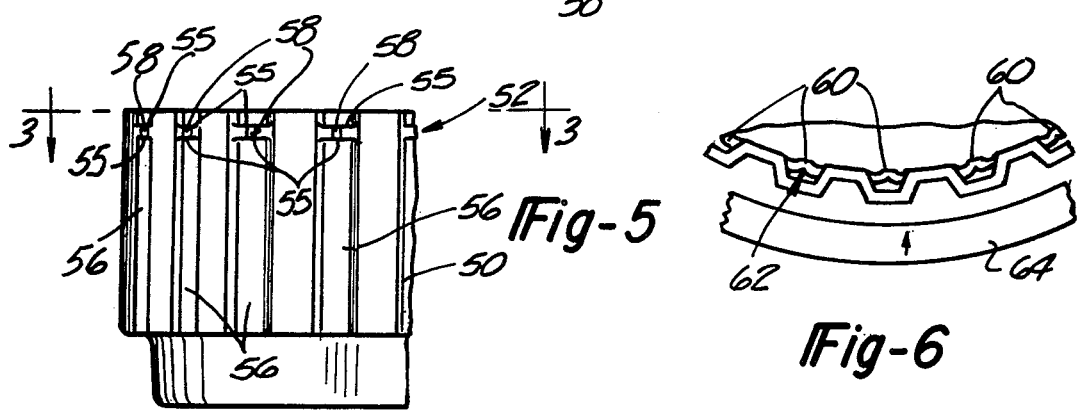
Fig-5
Fig-6

METHOD OF FORMING AN ANNULAR SLOT IN A LONGITUDINALLY SPLINED ANNULAR MEMBER

CROSS REFERENCE TO RELATED APPLICATIONS

This application is a division application of Ser. No. 617,814 filed Sept. 29, 1975, now U.S. Pat. No. 4,014,619.

BACKGROUND OF THE INVENTION

I. Field of the Invention

The present invention relates to splined members and more particularly to the construction of a slot in such members to receive a snap-type retaining ring.

II. Description of the Prior Art

It is conventional practice to form slots in splined clutch housings or brake drums or the like to receive snap type retaining rings for the purpose of retaining clutch or brake plates with respect to the splined housings or drums. However, such means as have been heretofore employed have utilized machining or other operations which are quite costly and which require deburring or special design concessions to the snap ring.

SUMMARY OF THE PRESENT INVENTION

The present invention overcomes the problems associated with previous methods of providing a slot in splined members for receiving a snap type retaining ring. Rather than machining the slots and thereby requiring deburring, the slot is formed by providing a series of individual lances in the root section of each spline.

In this way, rather than removing material to thereby weaken the part as well as requiring further machining, such as deburring, the material is merely displaced.

While lancing of course is not new, utilizing such means to form the slot for receiving a retainer ring in a splined member overcomes serious problems associated with previously used methods for forming such slots.

DESCRIPTION OF THE DRAWINGS

A better understanding of the present invention will be achieved by reference to the following description which refers to the attached drawings in which like reference characters refer to like parts throughout the several views and in which:

FIG. 1 is a cross sectional view illustrating one possible use of the present invention;

FIG. 2 is a fragmentary perspective view illustrating a preferred embodiment of the present invention;

FIG. 3 is an elevational view of a portion of the structure as seen substantially from line 3—3 of FIG. 5 thereof and enlarged somewhat for clarity;

FIG. 4 is a view as seen from the top of FIG. 2;

FIG. 5 is an elevational view of a portion of the structure shown in FIGS. 2–4 as seen from the side thereof; and FIG. 6 is a view similar to FIG. 4 but illustrating another preferred embodiment of the present invention.

Description of Several Preferred Embodiments of the Present Invention

Now referring to the drawings, FIG. 1 illustrates one assembly in which the present invention can be used. It is to be understood, however, that it is not intended to limit the invention to the use illustrated in FIG. 1.

FIG. 1 shows a portion of an automatic transmission for an automobile or the like as an example of a use of the present invention. The automatic transmission includes a splined clutch housing 12 fixed to a shaft 14 and rotatable therewith. A plurality of clutch plates 16 are trapped within the housing 12 by the splines thereof so that rotation of the shaft 14 produces rotation of the clutch housing 12 and the clutch plates 16 carried thereby.

A housing member 20 is also a splined clutch housing and clutch plates 18 are trapped by the splines formed about the outer periphery of the clutch housing 20. The housing 20 is fixed to a shaft (not shown). The clutch plates 18 are disposed intermediate and in frictional engagement with the clutch plates 18 so that power from the shaft 14 is transmitted through the clutch plates 16 and 18 to the housing member 20. A snap ring 22 fits in a slot 24 in a manner which will be described in greater detail hereinafter to prevent axial separation of the clutch plates 16 and 18 with respect to the housing 12 and the member 20.

The right hand section of the automatic transmission shown in FIG. 1 is similarly assembled and includes an externally splined clutch housing 30 which is fixed to the member 12 so that the housing 30 is rotatable with the shaft 14. Clutch plates 38 are trapped by the splines on the outer periphery of the housing 30 and thus rotate with the housing 30. Clutch plates 36 engage with the clutch plates 38 and are trapped within a splined clutch housing 40 so that power is transmitted from the shaft 14 through the members 12 and 30 and through the clutch plates 36 and 38 to the member 40. The member 40 is connected to other portions (not shown) of the transmission.

A retainer ring 32 carried in a slot 34 prevents axial separation of the clutch plates 36 and 38 with respect to the housings 30 and 40.

It is an improved means of forming the slots 24 and 34 that this particular invention is directed to. While such slots are utilized to hold snap-type retainer rings in splined clutch housings it is to be understood that such slots are also used to receive snap-type retainer rings in splined brake housings to thereby retain brake discs within the housings. The present invention contemplates a new means for forming such slots regardless of the use of the splined member and this should be kept in mind as the description proceeds.

In FIGS. 2–5 a splined member 50 similar to the splined members 12, 20, 30 and 40, is illustrated as having an inner peripheral slot 52 formed near the upper edge thereof for receiving a snap-type retaining ring 54. The slot 52 and the ring 54 correspond to the slots 24, 34 and rings 22, 32, respectively, shown in FIG. 1.

As can best be seen in FIGS. 2 and 5 the slot 52 is formed by a series of pairs of parallel, individual lances 55 in the root section 56 of each spline. The material 58 between the lanced portions 55 is then displaced radially outwardly to form the internal slot 52 in the assembly of FIGS. 2–5.

As can best be seen in FIG. 6 the material 60 between the lanced portions can also be displaced radially inwardly to form an external slot 62 to receive an externally mounted retaining ring 64.

It is apparent that the slots 52, 62 have been formed by a method which does not result in loss of material and thereby loss of strength. The material is simply displaced to form the slot. This also substantially reduces machining costs and makes it unnecessary to debur as is necessary when cutting or grinding operations are utilized to form the slot.

It is apparent that although several embodiments of the present invention have been disclosed many other changes and modifications can be made without departing from the spirit of the invention or the scope of the appended claims.

We claim:

1. A method of forming an annular slot in a longitudinally splined annular member to receive a snap-type retaining ring therein; said method comprising lancing the root section of each spline of said splined member along two spaced lines and further comprising the step of displacing the material between said lanced portions radially away from said root section.

2. The method as defined in claim 1 and in which the material between said lanced portions is displaced radially outwardly away from said root section.

3. The method as defined in claim 1 and in which the material between said lanced portions is displaced radially inwardly away from said root section.

4. A method of forming an annular slot in a longitudinally splined annular sheet metal member; said method comprising lancing the root section of each spline of said splined member along two spaced lines and further comprising the step of displacing the material between said lanced portions radially away from said root section.

5. The method defined in claim 4 wherein said material between said lanced portions is displaced radially outwardly away from said root section.

6. The method according to claim 4 wherein said material between said lanced portions is displaced radially inwardly away from said root section.

* * * * *